Aug. 28, 1962   W. C. SHAW   3,051,070
PRESSURE CONTROLLING MEANS IN AIRCRAFT AIR CONDITIONING SYSTEM
Original Filed Nov. 30, 1955
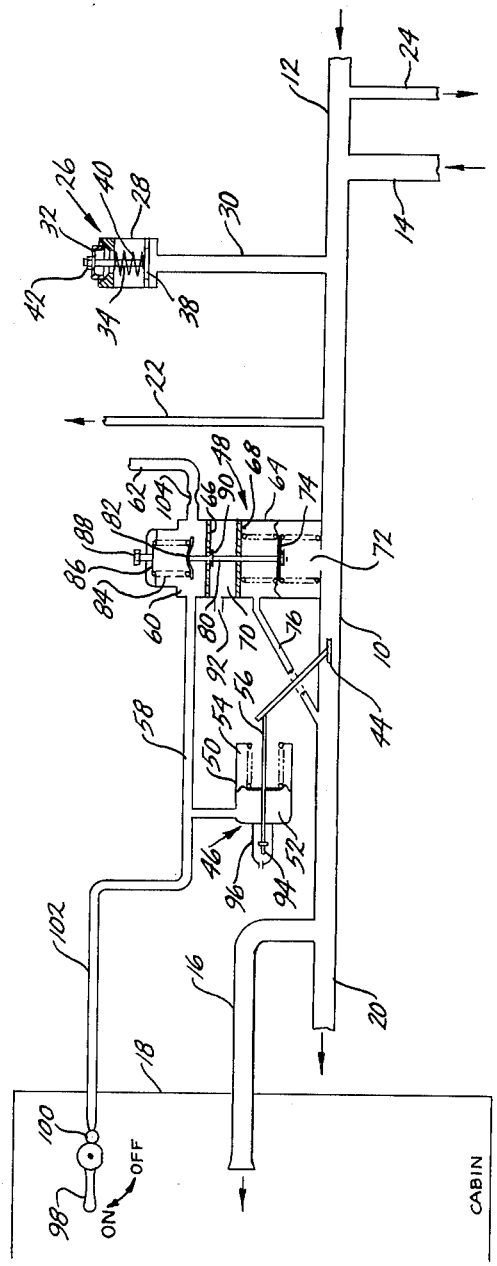
INVENTOR.
WALTER C. SHAW
BY Teller & McCormick
ATTORNEYS

United States Patent Office 3,051,070
Patented Aug. 28, 1962

3,051,070
PRESSURE CONTROLLING MEANS IN AIRCRAFT AIR CONDITIONING SYSTEM
Walter C. Shaw, Grand Junction, Colo., assignor to United Aircraft Corporation, East Hartford, Conn., a corporation of Delaware
Original application Nov. 30, 1955, Ser. No. 549,999, now Patent No. 2,925,255, dated Feb. 16, 1960. Divided and this application Feb. 6, 1959, Ser. No. 791,691
4 Claims. (Cl. 98—1.5)

This invention relates to aircraft air conditioning systems and, more particularly, to an air conditioning system for an aircraft having a cabin requiring conditioning air under pressure and having or carrying at least one device requiring conditioning air at greater than cabin pressure. This application constitutes a divisional application taken from my copending application, Serial No. 549,999, filed November 30, 1955, now Patent No. 2,925,255, titled "Aircraft Air Conditioning System."

It is the general object of the present invention to provide in an aircraft air conditioning system of the type mentioned, a network of pressurized air supply conduits together with pressure controlling means adapted to establish and maintain a desired relationship of the pressures in said conduits whereby to insure satisfaction of the pressurized air requirements of the cabin and other devices served by the conduits.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

In the drawing:

FIG. 1 is a schematic view of a network of conduits and pressure controlling means provided in accordance with the invention.

In the embodiment of the invention shown in the drawing, a main supply or "mixed air" conduit 10 is employed to supply various compartments and devices aboard an aircraft with pressure and temperature conditioned air. Cold pressurized air is supplied to the conduit 10 at all times from a conduit 12 and hot pressurized air is supplied to the said conduit 10 in selected quantities and at selected times from a conduit 14. The means providing the supply of cold air through the conduit 12 and hot air through the conduit 14 as well as the means for controlling the flow of hot air through the conduit 14 are shown and described in my above-mentioned copending application.

Extending from the main supply or "mixed air" conduit 10 is a cabin supply conduit 16 which directs pressure and temperature conditioned air to a cabin 18. A conduit 20 connected with the conduit 10 supplies pressure and temperature conditioned air to a cabin located de-fogging device which is not shown, but which is fully disclosed in my above-mentioned copending application. Air from the conduit 10 is also supplied to a pilot's space suit through a conduit 22. The space suit supplied by the conduit 22 requires air at a pressure greater than the cabin air pressure.

An additional compartment requiring air at greater than cabin pressure is supplied from the cold air conduit 12 through a conduit 24. This compartment is designated by the reference "A" in my above-mentioned copending application.

Pressure within the main supply or "mixed air" conduit 10 and pressure within the cold air conduit 12 and the hot air conduit 14 is limited to a selected maximum by means indicated generally at 26. The said pressure limiting means comprises a housing 28 which is connected with the conduit 10 through a conduit 30. The housing 28 has an open top which is normally closed by a valve dome 32. A threaded stem 34 extends through said dome and is connected at its bottom end with a spider 38 providing a seat for a vertically extending spring 40. The spring 40 which is engaged within the housing 28 biases the spider 38 and thus the valve dome 32 downwardly to close the said dome on the housing. When air pressure within the conduit 10 and the other conduits mentioned above exceeds a preselected maximum, it will lift the dome 32 from its seat to discharge air and thus relieve pressure within the said conduits. The pressure level at which the escape valve or dome 32 will open (the upper limit of pressure within the mixed air conduit and the other conduits) may be selected by adjusting an externally disposed nut 42 on the stem 34 so as to adjust the compression of the spring 40 which holds the valve or dome 32 closed.

While precise control of the pressure in the mixed air conduit 10 at levels below the selected maximum may not be essential to successful operation of the air conditioning system, it will be apparent that pressure controlling means for establishing and maintaining pressure in the said conduit at a level greater than cabin pressure is needed in order that the requirements of the space suit served by the conduit 22 and the compartment or compartments served by the conduit 24 may be satisfied. In accordance with the invention, valve means is provided for establishing and maintaining a selected pressure drop in the conduit 10 downstream of the conduit 22 and the pressure limiting means 26. The said valve means comprises a throttle valve 44 in the line 10, a throttle valve actuator 46 and control means 48 for the actuator 46.

The valve actuator 46 includes a housing 50 having a diaphragm-piston which defines an air chamber 52 and a spring chamber 54 within the housing. The diaphragm-piston is connected to the valve 44 by a mechanical linkage including a link 56 extending through the housing 50. Air pressure acting upon the diaphragm-piston tends to open the valve 44 in the conduit 10 and spring forces acting upon the diaphragm-piston tend to close the valve 44. Adjusting the valve 44 in various open positions in the conduit 10 to control the pressure drop therein is achieved by varying or adjusting the pressure in the air chamber 52. The air chamber 52 is connected by a conduit 58 with a flow chamber 60 in the actuator control means 48 and the said flow chamber 60 is connected with a source of servo air at substantially constant pressure through a conduit 62.

The actuator control means 48 compares air pressure on the downstream side of the valve 44 in the conduit 10 with air pressure on the upstream side of the said valve and adjusts pressure in the flow chamber 60 in accordance therewith so as to adjust air pressure in the air chamber 52 of the actuator 46. More specifically, the control means 48 comprises a housing 64 having two partitions 66 and 68 defining three chambers within the said housing. The said chambers comprise in top-to-bottom order the flow chamber 60, a vent chamber 70, and a working chamber 72. A diaphragm-piston 74 is disposed within the working chamber 72 and is exposed on one side to air within the conduit 10 upstream of the valve 44. On the other side of the diaphragm-piston 74, air is introduced from the downstream side of the valve 44 through a passageway 76. A stem 80 extends from the diaphragm-piston 74 through the partitions 66 and 68 into the flow chamber 60. A spring seat 82 is secured to the stem 80 within the flow chamber 60 and a spring 84 is seated thereon and on an adjustable seat 86. The seat 86 is adjusted by a screw 88 to vary the force biasing the piston stem 80 and thus the diaphragm-piston 74. The spring 84 acts with air pressure from the downstream side of the valve 44 and in opposition to air pressure from the upstream side of said valve.

From the foregoing it will be apparent that adjustment of the spring seat 86 by the screw 88 will adjust the biasing force on the diaphragm-piston 74 so that the said piston will move downwardly when the difference in pressure across the valve 10 from the upstream to the downstream sides thereof is less than a selected amount determined by the setting of the screw 88. Downward movement of the diaphragm-piston 74 and the piston stem 80 as a result of a pressure drop across the valve 44 which is less than the selected minimum is used to cause partial closing of the valve 44 to increase the pressure drop in the following way. A valve disk 90 is secured to the piston stem 80 to close an aperture in the partition 66 between the flow chamber 60 and the vent chamber 70 when the pressure drop across the valve 44 equals or exceeds the preselected minimum. When the said pressure drop is less than the preselected minimum and the piston stem 80 moves downwardly, the valve disk 90 is unseated in the aforesaid aperture so that air may flow from the flow chamber 60 to the vent chamber 70 and be discharged therefrom through one or more vent openings 92. Discharge or venting of the air from the flow chamber 60 will, of course, reduce the air pressure in the actuator air chamber 52 which, as previously described, causes the valve 44 to be moved toward closed position in the conduit 10 to increase the pressure drop thereacross.

In addition to establishing and maintaining a preselected minimum pressure drop in the conduit 10, the valve means can be adapted to limit the pressure drop across itself so that it will not exceed a preselected maximum. That is, means can be employed to limit the movement of the throttle valve 44 in the closed direction. Such means can conveniently be associated with the link 56 which extends through the actuator 46. For example, an extension 94 of adjustable effective length can be secured to the free end of the link 56 to engage with a stop 96 after the link 56 has moved a selected distance corresponding to closing movement of the valve 44 to a preselected maximum closed position.

The aforesaid maximum closed position of the valve 44 may be a completely closed position within the conduit 10 and, in any event, the said maximum closed position may be employed when it is desired to shut down the flow of air to the cabin 18 or to reduce the pressure of air flow thereto to a relatively low level. This selective positioning of the throttle valve 44 in the maximum closed position is effected by manual manipulation of an on-off selector 98 which may be located within the cabin 18. The selector 98 when shifted to the "off" position opens a valve 100 in a conduit 102 which communicates with the air chamber 52 in the valve actuator 46. The valve 100 then vents the conduit 102 and the air chamber 52 to close the throttle valve 44.

The manually operable valve 100 is opened by the selector element 98 only when it is desired to shut off a pressured supply of air to the cabin 18. Obviously, the air conditioning system is not shut down wholly by operation of the valve 100 and the conduits 22 and 24 upstream of the valve 44 are supplied with pressurized air even after movement of the valve 44 to its maximum closed position. By limiting the maximum closed position of the throttle valve 44 to less than a fully closed position, the cabin 18 can continue to receive air through the cabin inlet conduit 16 but at no substantial pressure. In addition, the defogging device supplied from the conduit 20 will continue to receive air from the conduit 10 but at no substantial pressure.

It will also be observed that opening of the valve 100 to vent the air chamber 52 in the valve actuator 46 does not vent all of the air at controlled pressure from the servo conduit 62. More specifically, the said conduit 62 is provided with a restrictor 104 which serves to maintain pressure in the various servo lines in the system during the aforesaid venting operation. In addition to this function, it will be apparent that the restrictor 104 permits a substantial change to be accomplished in the pressure of the air in the flow chamber 60 and in the actuator air chamber 52 as a result of only slight movement of the piston stem 80 and the disk valve 90 relative to the aperture in the partition 66.

The invention claimed is:

1. An air conditioning system for an aircraft having a cabin requiring air under pressure and having or carrying at least one other compartment requiring air at greater than cabin air pressure, the said system comprising pressurized air conduit means including a conduit connected with the cabin, a conduit extending from said cabin conduit to said other compartment, a valve adjustably disposed in said cabin conduit downstream of said conduit extending to said other compartment, valve operating means adapted to adjust the position of the valve so as to maintain a predetermined pressure drop thereacross and including an actuator comprising a housing having piston means disposed therein and operatively connected with said valve, resilient means biasing said piston means in one direction to close said valve, said housing defining a fluid chamber for receiving fluid under pressure to move said piston means in the opposite direction to open the valve, said operating means also including valve means movable in one direction to vent said fluid chamber and movable in the opposite direction to close said chamber, the said valve means being responsive to fluid pressure in said cabin conduit on the downstream side of the said valve to move in said one direction, said valve means being responsive to fluid pressure in said cabin conduit on the upstream side of the said valve to move in said opposite direction.

2. An air conditioning system for an aircraft having a cabin requiring air under pressure and having or carrying at least one other compartment requiring air at greater than cabin air pressure, the said system comprising pressurized air conduit means including a conduit connected with the cabin, a conduit extending from said cabin conduit to said other compartment, a valve adjustably disposed in said cabin conduit downstream of said conduit extending to said other compartment, valve operating means adapted to adjust the position of the valve so as to maintain a predetermined pressure drop thereacross and including an actuator comprising a housing having piston means disposed therein and operatively connected with said valve, resilient means biasing said piston means in one direction to close said valve, manually adjustable means for limiting the movement of said piston means in said one direction, said housing defining a fluid chamber for receiving fluid under pressure to move said piston means in the opposite direction whereby to open said valve, said operating means also including valve means movable in one direction to vent said fluid chamber and movable in the opposite direction to close said fluid chamber, manually adjustable spring means biasing said valve means in said one direction, the said valve means being responsive also to air pressure in said cabin conduit downstream of said valve to move in said one direction, and the said valve means being responsive to air pressure in said cabin conduit upstream of said valve to move in said opposite direction.

3. An air conditioning system for an aircraft having a cabin requiring air under pressure and having or carrying at least one other compartment requiring air at greater than cabin pressure, the said system comprising pressurized air conduit means including a conduit connected with the cabin, a conduit extending from said cabin conduit to said other compartment, a valve adjustably disposed in said cabin conduit downstream of said conduit extending to said other compartment, valve operating means adapted to adjust the position of the valve so as to maintain a predetermined pressure drop thereacross and including an actuator comprising a housing having piston means disposed therein and operatively connected with said valve, resilient biasing means disposed in said housing and biasing said piston means in one direction to close said valve, said housing defining an air chamber for receiving air under pressure to move said piston means in the opposite direction whereby to open said valve, said valve operating means also including control means comprising a housing defining a flow chamber and a working chamber, the flow chamber being adapted to receive air under pressure and being connected with said air chamber, fluid pressure responsive valve means disposed in said working chamber and movable in one direction to vent said flow chamber and movable in the opposite direction to close said flow chamber, spring means biasing said valve means in said one direction, and means for adjusting the force of said spring means, the said valve means being exposed within said working chamber to air from the downstream side of the said valve to move said valve means in said one direction, and the said valve means being exposed within said working chamber to air from the upstream side of the said valve to move said valve means in said opposite direction.

4. An air conditioning system for an aircraft having a cabin requiring air under pressure and having or carrying at least one other compartment requiring air at greater than cabin pressure, the said system comprising pressurized air conduit means including a conduit connected with the cabin, a conduit extending from said cabin conduit to said other compartment, a valve adjustably disposed in said cabin conduit downstream of said conduit extending to said other compartment, valve operating means adapted to adjust the position of the valve so as to maintain a predetermined pressure drop thereacross and including an actuator comprising a housing having piston means disposed therein and operatively connected with said valve, resilient means biasing said piston means in one direction to close said valve, manually adjustable means associated with said piston means for limiting the closure of the said valve, said housing defining a fluid chamber for receiving fluid under pressure to move said piston means in the opposite direction whereby to open said valve, said valve operating means also including control means comprising a housing defining a flow chamber and a working chamber, the flow chamber being adapted to receive fluid under pressure and being connected with said fluid chamber, fluid pressure responsive valve means disposed in said working chamber and movable in one direction to vent said flow chamber and movable in the opposite direction to close said flow chamber, spring means biasing said valve means in said one direction, means for adjusting the force of said spring means, the said valve means being exposed within said working chamber to fluid from the downstream side of the said valve to move said valve means in said one direction, the said valve means also being exposed within said working chamber to fluid from the upstream side of the said valve to move said valve means in said opposite direction.

References Cited in the file of this patent
UNITED STATES PATENTS

| | | |
|---|---|---|
| 2,111,837 | Brisbane | Mar. 22, 1938 |
| 2,276,371 | Cooper et al. | Mar. 17, 1942 |
| 2,399,938 | Pett | May 7, 1946 |
| 2,851,254 | Messinger et al. | Sept. 9, 1958 |
| 2,858,700 | Rose | Nov. 4, 1958 |
| 2,877,791 | Rich | Mar. 17, 1959 |
| 2,923,222 | Manning et al. | Feb. 2, 1960 |